US011333106B2

(12) United States Patent
Baron Von Ceumern-Lindenstjerna et al.

(10) Patent No.: US 11,333,106 B2
(45) Date of Patent: May 17, 2022

(54) INTERNAL COMBUSTION ENGINE AND METHOD FOR EXHAUST AFTERTREATMENT THEREOF

(71) Applicant: VOLKSWAGEN AKTIENGESELLSCHAFT, Wolfsburg (DE)

(72) Inventors: Falk-Christian Baron Von Ceumern-Lindenstjerna, Braunschweig (DE); Christoph Nee, Wolfsburg (DE); Sebastian Gehrke, Meine (DE); Mathias Hauptvogel, Weferlingen (DE)

(73) Assignee: VOLKSWAGEN AKIIHNGESELLSCHAFT, Wolfsburg (DE)

( * ) Notice: Subject to any disclaimer, the term of this patent is extended or adjusted under 35 U.S.C. 154(b) by 95 days.

(21) Appl. No.: 16/708,698

(22) Filed: Dec. 10, 2019

(65) Prior Publication Data
US 2020/0182200 A1    Jun. 11, 2020

(30) Foreign Application Priority Data

Dec. 10, 2018  (DE) .................... 10 2018 131 536.8

(51) Int. Cl.
*F02M 26/06*    (2016.01)
*F02M 26/10*    (2016.01)
(Continued)

(52) U.S. Cl.
CPC ............ *F02M 26/06* (2016.02); *F02M 26/15* (2016.02); *F01N 3/035* (2013.01); *F01N 3/101* (2013.01);
(Continued)

(58) Field of Classification Search
CPC ...... F01N 3/035; F01N 3/101; F01N 13/0093; F01N 13/009; F01N 9/02; F01N 9/04;
(Continued)

(56) References Cited

U.S. PATENT DOCUMENTS

2007/0204598 A1    9/2007  Wirth et al.
2011/0072788 A1*   3/2011  Ruona ................... F01N 9/00
                                                    60/276
(Continued)

FOREIGN PATENT DOCUMENTS

CN    102200075 A    9/2011
CN    103201484 A    7/2013
(Continued)

OTHER PUBLICATIONS

Search report for German Patent Application No. 10 2018 131 536.8, dated Nov. 22, 2019.
(Continued)

*Primary Examiner* — Audrey B. Walter
*Assistant Examiner* — Dapinder Singh
(74) *Attorney, Agent, or Firm* — Pearl Cohen Zedek Latzer Baratz LLP

(57) ABSTRACT

The invention relates to an internal combustion engine with an air intake system and an exhaust system is embodied as an internal combustion engine, in particular a gasoline engine, that is charged by means of an exhaust gas turbocharger. At least one three-way catalytic converter is arranged in the exhaust system of the internal combustion engine. Furthermore, a low-pressure exhaust gas recirculation system is provided that connects the exhaust system downstream from a turbine of the exhaust gas turbocharger and upstream from the at least one three-way catalytic converter to the air intake system upstream from a compressor of the exhaust gas turbocharger. The invention further
(Continued)

relates to a method for exhaust aftertreatment of such an internal combustion engine.

13 Claims, 4 Drawing Sheets

(51) Int. Cl.
    *F01N 3/02*           (2006.01)
    *F01N 3/10*           (2006.01)
    *F02M 26/15*         (2016.01)
    *F01N 3/035*        (2006.01)

(52) U.S. Cl.
    CPC .......... *F01N 2240/36* (2013.01); *F02M 26/10* (2016.02)

(58) Field of Classification Search
    CPC .......... F01N 2240/036; F01N 2250/02; F02D 41/0295; F02D 41/0235; F02D 41/029; F02D 41/065; F02D 41/042; F02D 41/1454; F02D 41/1441; F02D 41/0005; F02D 41/0007; F02D 41/0055; F02D 41/123; F02D 21/08; F02D 9/02; F02D 9/04; F02M 26/06; F02M 26/10; F02M 26/15; F02M 26/17; F02M 26/23; F02M 26/35; F02M 35/10157; F02M 35/10006; Y02T 10/12; Y02T 10/40
See application file for complete search history.

(56) References Cited

U.S. PATENT DOCUMENTS

| | | | |
|---|---|---|---|
| 2012/0240557 A1* | 9/2012 | Kawaguchi | ............... F01N 3/20 60/278 |
| 2013/0297192 A1 | 11/2013 | Imeroski | |
| 2014/0090362 A1 | 4/2014 | Eckhoff et al. | |
| 2014/0136074 A1 | 5/2014 | Wang et al. | |
| 2015/0128587 A1* | 5/2015 | Dane | ...................... F02M 26/28 60/605.2 |
| 2016/0146136 A1* | 5/2016 | Surnilla | ................ F02D 41/005 123/568.21 |
| 2016/0177887 A1* | 6/2016 | Fischer | .................. F02M 26/43 60/605.2 |
| 2017/0276096 A1* | 9/2017 | Fischer | .................. F02M 26/44 |

FOREIGN PATENT DOCUMENTS

| | | |
|---|---|---|
| CN | 103807039 A | 5/2014 |
| DE | 10 2006 010 095 A1 | 9/2007 |
| DE | 10 2008 015 600 A1 | 10/2009 |
| DE | 10 2009 032 659 A1 | 1/2011 |
| DE | 10 2011 101 079 A1 | 11/2012 |
| DE | 10 2015 216 730 A1 | 8/2016 |
| DE | 10 2015 220 039 A1 | 8/2016 |
| DE | 10 2015 108 223 A1 | 12/2016 |
| DE | 10 2016 118 309 A1 | 3/2018 |
| DE | 10 2016 120 432 A1 | 4/2018 |
| DE | 10 2017 103 560 A1 | 8/2018 |
| JP | 2000145439 A | 5/2000 |

OTHER PUBLICATIONS

Search report for European Patent Application No. EP 19 21 4335, dated May 13, 2020.
Office Action for Chinese Patent Application No. 201911249027.3, dated May 31, 2021.
Office Action for Chinese Patent Application 201911249027.3, dated Jan. 29, 2022.

* cited by examiner

INTERNAL COMBUSTION ENGINE AND METHOD FOR EXHAUST AFTERTREATMENT THEREOF

CROSS-REFERENCE TO RELATED APPLICATIONS

This application claims priority from German Patent Application No. 10 2018 131 536.8 filed Dec. 10, 2018, which is hereby incorporated by reference.

FIELD OF THE INVENTION

The invention relates to an internal combustion engine and to a method for exhaust aftertreatment of an internal combustion engine.

BACKGROUND OF THE INVENTION

The continuous tightening of the exhaust emission legislation places high demands on vehicle manufacturers, which are met through appropriate measures for reducing engine raw emissions and through corresponding exhaust aftertreatment. With the introduction of legislation tier EU6, a limit value for gasoline engines is prescribed for a number of particles, which in many cases necessitates the use of a gasoline particulate filter. When driving, such a gasoline particulate filter becomes loaded with soot. In order to prevent the exhaust-gas backpressure from increasing excessively, this gasoline particulate filter must be regenerated continuously or periodically. The increase in the exhaust-gas backpressure can lead to an increase in the consumption of the internal combustion engine, loss of power, as well as diminished smoothness and even misfires. In order to carry out thermal oxidation of the soot retained in the gasoline particulate filter with oxygen, a sufficiently high temperature level in conjunction with simultaneously existing oxygen in the exhaust system of the gasoline engine is required. Since modern gasoline engines are normally operated without an oxygen surplus with a stoichiometric combustion air ratio ($\lambda=1$), additional measures are required. Examples of measures that merit consideration for this purpose include an increase in temperature through a ignition angle adjustment, a temporary lean setting of the gasoline engine, injection of secondary air into the exhaust system, or a combination of these measures. An ignition angle adjustment toward late in combination with a lean setting of the gasoline engine has heretofore been preferably used, since this method requires no additional components and can deliver a sufficient amount of oxygen at most operating points of the gasoline engine.

In the case of a gasoline particulate filter, however, load conditions also occur in which an uncontrolled flow through the gasoline particulate filter with oxygen is undesirable. If the load level of the gasoline particulate filter reaches a critical level, an overrun phase of the internal combustion engine together with a high temperature of the gasoline particulate filter can lead to uncontrolled soot burn-off on the gasoline particulate filter. The exothermic oxidation of the soot particles can result in such high temperatures on the component surface of the gasoline particulate filter that thermal damage to the gasoline particulate filter can occur. It may therefore be necessary to reduce or completely eliminate the oxygen input into the gasoline particulate filter in certain operating situations.

Furthermore, at least one catalytic converter is arranged in the exhaust system. The one or more catalytic converters have an oxygen storage component that is filled with oxygen during overrun operation of the internal combustion engine or in the event of a superstoichiometric combustion air ratio. When the oxygen storage component of the catalytic converters is under a high load, however, there is a risk of the nitrogen oxides not being able to be converted at all or only inadequately, which can lead to an increase in nitrogen oxide emissions. Overrun of the internal combustion engine can have the effect that fresh air is conveyed through the combustion chambers and pushed out through the exhaust duct. This allows the exhaust aftertreatment components to cool down and the temperature to drop below their light-off temperature, so that upon conclusion of the overrun operation, only an incomplete conversion of the limited pollutants in the exhaust gas can take place.

An internal combustion engine with an air intake system and an exhaust aftertreatment system is known from DE 10 2015 108 223 A1. An exhaust gas recirculation line is provided that connects the exhaust system of the internal combustion engine downstream from a turbine of the exhaust gas turbocharger and upstream from a catalytic converter to the air intake system downstream from a compressor of the exhaust gas turbocharger. A provision is made that the fresh air introduced into the exhaust system during overrun of the internal combustion engine is used to regenerate a particulate filter.

DE 10 2015 220 039 A1 discloses an internal combustion engine with an air intake system and an exhaust system, the exhaust system being connected downstream from a nitrogen oxide absorber and an additional exhaust aftertreatment component to the air intake system upstream from a compressor of an exhaust gas turbocharger. A charge air cooler with a bypass is provided in the air intake system with which the intake air can be conducted past the charge air cooler into the combustion chambers of the internal combustion engine in order to influence the nitrogen oxide emissions. A provision is made that, when the internal combustion engine is in overrun mode, fuel is injected into the exhaust system or the combustion chambers in order to regenerate the nitrogen oxide adsorber with a substoichiometric exhaust gas.

Moreover, DE 10 2016 120 432 A1 discloses an exhaust aftertreatment system for an internal combustion engine in which a particulate filter is arranged in the exhaust system of the internal combustion engine. In order to prevent uncontrolled soot burn-off on the particulate filter during overrun operation of the internal combustion engine, a bypass is provided for the particulate filter through which the exhaust gas can be conducted during overrun operation of the internal combustion engine in order to prevent uncontrolled soot-burn-off and thus thermal damage to the particulate filter.

It is the object of the invention to reduce the consumption of an internal combustion engine and to reduce emissions, in particular nitrogen oxide emissions, and to keep the exhaust aftertreatment components at their operating temperature for as long as possible.

SUMMARY OF THE INVENTION

According to the invention, this object is achieved by an internal combustion engine having an air intake system and an exhaust system, with the internal combustion engine being charged by means of an exhaust gas turbocharger, and with at least one three-way catalytic converter being arranged in the exhaust system. It is envisaged that a low-pressure exhaust gas recirculation system is provided that connects the exhaust system downstream from a turbine of the exhaust gas turbocharger and upstream from the at least one three-way catalytic converter to the air intake system upstream from a compressor of the exhaust gas turbocharger. The internal combustion engine is preferably embodied as a combustion engine that is spark-ignited by means of spark plugs according to the Otto principle. By virtue of the low-pressure exhaust gas recirculation system, the exhaust gas can be circulated during an unfired overrun operation of the internal combustion engine, whereby a cooling of the exhaust aftertreatment components is prevented and, parallel thereto, filling of an oxygen storage component of the three-way catalytic converter during overrun operation is also prevented. In addition, nitrogen oxides that are embedded in an adsorption catalyst can be prevented from desorbing thermally, whereby the nitrogen oxide emissions can be reduced.

Advantageous improvements and developments of the internal combustion engine specified in the independent claim can be advantageously improved and developed by the features cited in the dependent claims.

In a preferred embodiment of the invention, a provision is made that the low-pressure exhaust gas recirculation system has an exhaust gas recirculation line that branches off at a branch immediately downstream from the turbine and upstream from all exhaust aftertreatment components from an exhaust duct of the exhaust system and leads into an intake port of the air intake system at a junction downstream from an air filter and upstream from the compressor. By having the exhaust gas recirculation line branch off upstream from all of the exhaust aftertreatment components, it can be ensured that fresh air does not flow through them during operation in an exhaust gas recirculation mode, thereby slowing the cooling of the three-way catalytic converters and, at the same time, preventing oxygen from becoming embedded in the oxygen storage components of the three-way catalytic converters. Thus, the catalytic converters are immediately ready for use even upon resumption of fired engine operation and can convert harmful exhaust gas components without causing slippage. The filling of the oxygen storage component is particularly critical with respect to the nitrogen oxide emissions, since when the oxygen storage component is filled and the engine is being operated superstoichiometrically, there is no way to convert the nitrogen oxides contained in the exhaust of the engine into molecular nitrogen.

In an advantageous embodiment of the internal combustion engine, a provision is made that a throttle valve is provided in the intake stroke downstream from the compressor. A throttle valve enables the amount of fresh air supplied to the combustion chambers of the internal combustion engine to be controlled. In addition, the exhaust gas mass flow can be regulated by the throttle valve during operation of the internal combustion engine in overrun mode, since the unburned fresh air is pushed through the combustion chambers into the exhaust system during overrun operation.

It is particularly preferred if a pre-throttle valve is arranged in the air intake system upstream from a junction of the exhaust gas recirculation line. The pressure in the intake port can be reduced by means of a pre-throttle valve in the air intake system upstream from the junction, resulting in a negative pressure in the intake port downstream from this pre-throttle valve. The scavenging gradient between the exhaust duct and the air intake system can thus be increased, thereby promoting the circulation of exhaust gas through the exhaust gas recirculation line.

In a preferred embodiment of the internal combustion engine, a provision is made that an exhaust gas recirculation cooler is arranged in the low-pressure exhaust gas recirculation system. An exhaust gas recirculation cooler in the exhaust gas recirculation line enables the temperature of the circulating exhaust gas to be reduced. As a result, the raw emissions of the internal combustion engine, in particular the nitrogen oxide raw emissions, can be reduced.

Furthermore, a provision is advantageously made that an additional three-way catalytic converter is arranged in the low-pressure exhaust gas recirculation system. Unburned hydrocarbons and carbon monoxide can be converted to carbon dioxide and water vapor by the additional three-way catalytic converter in order to prevent acid formation by condensation in the low-pressure exhaust gas recirculation system or in the air intake system. Furthermore, nitric oxide can be oxidized to nitrogen dioxide in order to reduce the tendency of the internal combustion engine to knock. As a result, the operating range of the internal combustion engine can be expanded and the fuel consumption can be reduced, since no internal engine measures for preventing knocking are necessary.

In an alternative embodiment of the invention, a provision is made that a first three-way catalytic converter is arranged in the exhaust system upstream from the branch and a second three-way catalytic converter is arranged downstream from the branch. This results in further degrees of freedom in the arrangement of the exhaust aftertreatment components. The first three-way catalytic converter can thus be combined particularly as a hot-end particulate filter with a three-way catalytically active coating with a second three-way catalytic converter in an underfloor position of the motor vehicle. Additional catalyst volume is thus provided, so that even with aging of the catalyst and a concomitant reduction in conversion efficiency, an efficient exhaust aftertreatment of the exhaust gas of the internal combustion engine is still possible.

It is particularly preferred if the first three-way catalytic converter is a particulate filter with a three-way catalytically active coating and if the exhaust flap is located downstream from the branch and upstream from the second three-way catalytic converter. The particulate filter is flowed through by the circulating exhaust gas and maintained at a temperature in order, following overrun mode, to enable the particulate filter to be regenerated during fired operation of the internal combustion engine and to prevent pronounced cooling below the regeneration temperature.

Alternatively, a provision advantageously made that a particulate filter is arranged downstream from the at least one three-way catalytic converter. Alternatively, the particulate filter can also be arranged downstream from the branch. In the process, the exhaust gas is also freed of solids that precipitate in the particulate filter, and thus the soot emissions of the internal combustion engine are also reduced.

In another improvement of the internal combustion engine, a provision is advantageously made that an exhaust flap with which the exhaust duct can be blocked is provided downstream from a branch of an exhaust gas recirculation line of the low-pressure exhaust gas recirculation system from an exhaust duct of the internal combustion engine.

According to the invention, a method for exhaust gas aftertreatment of such an internal combustion engine is proposed that comprises the following steps:
  detecting an overrun of the internal combustion engine,
  closing a pre-throttle valve in the air intake system upstream from a junction of an exhaust gas recirculation line of the low-pressure exhaust gas recirculation system,
  closing an exhaust flap in the exhaust duct,
  opening an exhaust gas recirculation valve and a throttle valve in the air intake system downstream from the compressor of the exhaust gas turbocharger,
  switching off the ignition and the introducing fuel into the combustion chambers of the internal combustion engine, and circulating the exhaust gas through the low-pressure exhaust gas recirculation system, the air intake system downstream from the junction, the combustion chambers of the internal combustion engine, and the exhaust system upstream from the branch, with entry of fresh air into at least the last three-way catalytic converter in the direction of flow of an exhaust gas through the exhaust system being prevented.

A method according to the invention enables the fuel consumption of the internal combustion engine to be reduced in comparison to a fired overrun operation. Furthermore, the raw emissions of the internal combustion engine can be reduced while preventing the three-way catalytic converters or other exhaust aftertreatment components from cooling below their respective operating temperatures at which efficient conversion or storage of pollutants is possible.

According to an advantageous embodiment of the method, a provision is made that the circulating exhaust gas has substantially a stoichiometric combustion air ratio. In a preferred embodiment of the method, a provision is made that fuel is introduced into the combustion chambers of the internal combustion engine during an overrun phase of the internal combustion engine with the exhaust flap closed. In order to ensure that there is no increase in the oxygen content of the exhaust gas circulating through the exhaust gas recirculation line even during a prolonged overrun phase, a provision is made that small quantities of fuel are additionally introduced into the combustion chambers of the internal combustion engine. This is preferably achieved through injection of fuel into the combustion chambers of the internal combustion engine, but it can also be achieved alternatively through injection into the air intake system or the exhaust system of the internal combustion engine. A stoichiometric exhaust gas can be used to prevent the oxygen storage component of the three-way catalytic converters from being filled, so that efficient conversion of pollutants is possible when motor combustion resumes.

In a preferred embodiment of the method, a provision is made that the internal combustion engine is decelerated in the overrun phase and comes to a standstill, the pre-throttle valve being opened and the throttle valve and the exhaust gas recirculation valve being closed before the internal combustion engine is started again. This can facilitate the starting of the internal combustion engine in the event of a planned resumption of engine combustion.

In an advantageous improvement of the method, a provision is made that the internal combustion engine is operated with a stoichiometric combustion air ratio ($\lambda=1$) until the exhaust flap is completely closed. Through stoichiometric engine operation until complete closing of the exhaust flap, it can be ensured that, even in the first overrun phase, no oxygen-rich exhaust gas is introduced into the three-way catalytic converters and thus the oxygen storage components of the three-way catalytic converters are not loaded, or at least not fully.

In an advantageous development of the method, a provision is made that an additional three-way catalytic converter is arranged in the low-pressure exhaust gas recirculation system, with unburned hydrocarbons and carbon monoxide being converted to carbon dioxide and water vapor by the additional three-way catalytic converter in order to prevent acidification as a result of condensation in the low-pressure exhaust gas recirculation system or in the air intake system, and with nitric oxide being oxidized to nitrogen dioxide in order to reduce the tendency of the internal combustion engine to knock. This makes it possible to prevent corrosion from occurring in the low-pressure exhaust gas recirculation system or in the air intake system of the internal combustion engine. What is more, by reducing the tendency to knock, the operating range of the internal combustion engine can be extended, resulting in lower fuel consumption and/or lower raw emissions.

Unless otherwise stated in the individual case, the various embodiments of the invention mentioned in this application can be advantageously combined with one another.

BRIEF DESCRIPTION OF THE DRAWINGS

The invention will be explained below in exemplary embodiments with reference to the accompanying drawing. Same components or components with the same function in the drawings are respectively identified by same reference numerals. In the drawing.

DETAILED DESCRIPTION OF THE INVENTION

Figure 1:
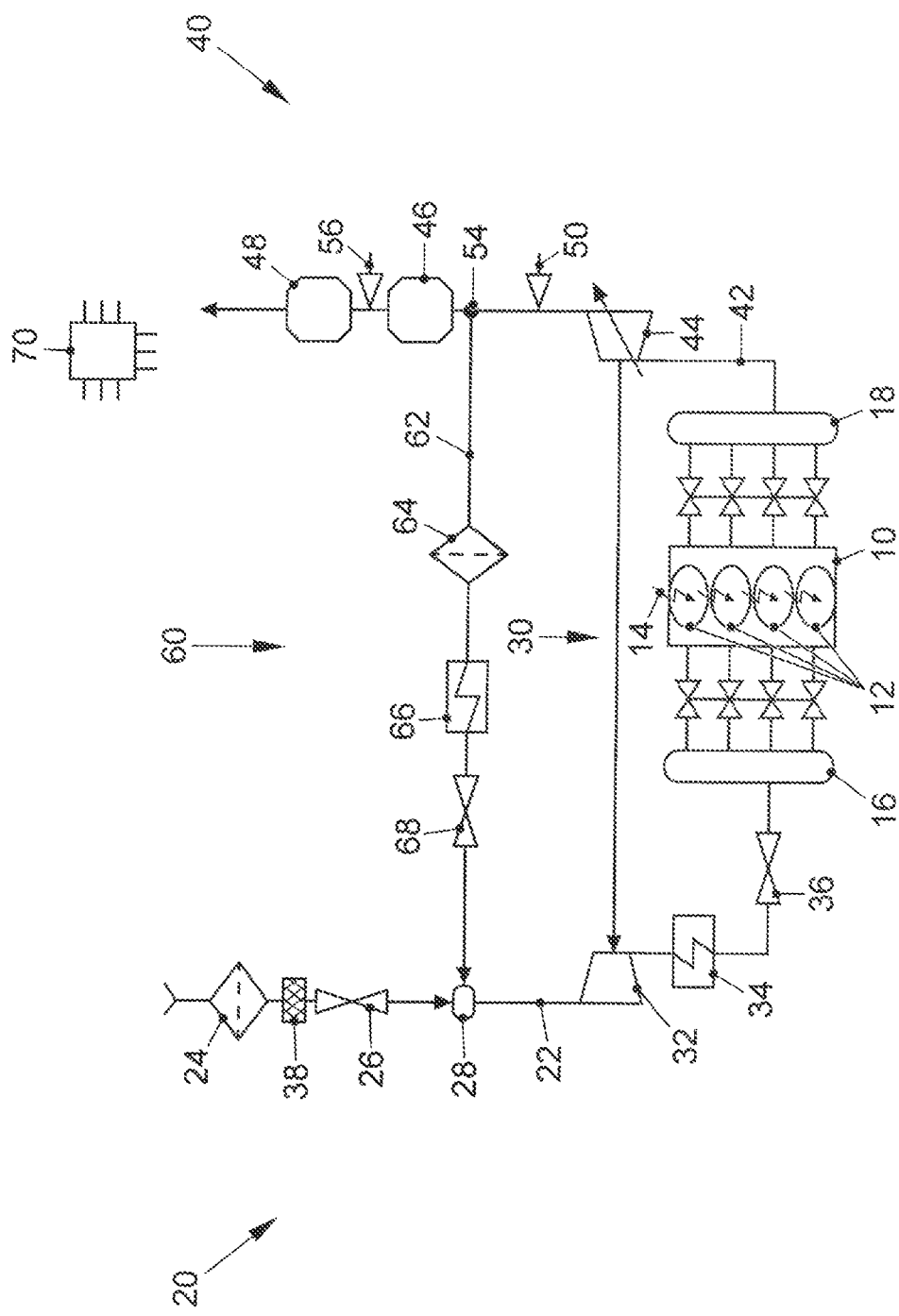
FIG. 1 shows a first exemplary embodiment of an internal combustion engine according to the invention.

FIG. 1 shows an internal combustion engine 10 for a motor vehicle that is embodied as an internal combustion engine 10 that is spark-ignited with spark plugs 14 according to the Otto principle. The internal combustion engine 10 is connected with its outlet 18 to an exhaust system 40. The outlet 18 comprises an exhaust manifold, which supplies the exhaust gases of the different combustion chambers 12 of the internal combustion engine 10 to an exhaust duct 42 of the exhaust system 40. The internal combustion engine 10 is connected at its intake 16 to an air intake system 20. The air intake system 20 has an air filter 24 in the direction of flow of the fresh air through an intake port 22 of the air intake system 20 and a pre-throttle valve 26 downstream from the air filter 24. At a junction 28 downstream from the pre-throttle valve 26, an exhaust gas recirculation line 62 of a low-pressure exhaust gas recirculation system 60 opens into the intake port 22 of the air intake system 20. The pre-throttle valve 26 serves the function of pre-throttling the intake air and generating a negative pressure in the air intake system 20 downstream from this pre-throttle valve 26. A compressor 32 of an exhaust gas turbocharger 30 is arranged downstream from the junction 28. A charge air cooler 34 and a throttle valve 36 for controlling the amount of air supplied to the combustion chambers 12 of the internal combustion engine 10 are provided downstream from the compressor 32 and upstream from the inlet 16 of the internal combustion engine 10. Furthermore, an air mass meter 38 can be provided in the air intake system 20 in order to measure the amount of fresh air sucked in.

The exhaust system 40 has an exhaust duct 42 in which a turbine 44 of the exhaust gas turbocharger 30 is provided in the direction of flow of an exhaust gas of the internal combustion engine 10 through the exhaust system 40, a first three-way catalytic converter 46 is provided downstream from the turbine 44, and a second three-way catalytic converter 48 is provided downstream from the first three-way catalytic converter 46. An exhaust gas recirculation duct 62 of a low-pressure exhaust gas recirculation from the exhaust duct 42 of the internal combustion engine at a junction 54 downstream from the turbine 44 and upstream from the first three-way catalytic converter 46. A first lambda sensor 50, particularly a wideband lambda sensor, with which the oxygen content in the exhaust gas can be measured is provided downstream from the turbine 44 and upstream from the branch 54 at the exhaust duct 42. A second lambda sensor, particularly a two-step sensor, is preferably provided downstream from the first three-way catalytic converter 46 and upstream from the second three-way catalytic converter 48 with which the combustion air ratio downstream from the first three-way catalytic converter 46 and upstream from the second three-way catalytic converter 48 can be assessed. Alternatively, the first lambda sensor 50 can also be arranged downstream from the outlet 18 of the internal combustion engine 10 and upstream from the turbine 44 of the exhaust gas turbocharger 30. At least one of the three-way catalytic converters 46, 48 can be embodied as a particulate filter 52 having a three-way catalytically active coating in order to additionally retain the soot particles contained in the exhaust gas of the internal combustion engine 10. An exhaust flap is provided downstream from the branch 54, preferably downstream from the two three-way catalytic converters 46, 48, in order to reduce and/or block the cross section of the exhaust duct 42 and thus support a circulation of the exhaust gas through the low-pressure exhaust gas recirculation system. Furthermore, the internal combustion engine 10 has an engine control unit 70 with which the injection quantity and the injection time of fuel into the combustion chambers 12 of the internal combustion engine 10 are regulated.

The low-pressure exhaust gas recirculation system 60 comprises an exhaust gas recirculation line 62 in which a filter 64, an exhaust gas recirculation cooler 66, and an exhaust gas recirculation valve 68 are disposed in order to control the amount of recirculated exhaust gas. The exhaust gas recirculation line 62 leads at the junction 28 into the intake port 22 of the air intake system 20.

During normal operation of the internal combustion engine 10 as shown in FIG. 1, the exhaust flap is open and the exhaust gas recirculation valve 68 is closed, so that the exhaust gas of the internal combustion engine 10 flows through the two three-way catalytic converters 46, 48 and the harmful exhaust gas components are converted. At the same time, the internal combustion engine 10 is operated with a stoichiometric combustion air ratio (λ=1), and the limited pollutants—in particular carbon monoxide (CO), unburned hydrocarbons (HC), and nitrogen oxides (NOx)—contained in the exhaust gas are converted on the catalytically active surfaces of the three-way catalytic converters 46, 48. Through a reduction of the power output required by the driver from the internal combustion engine 10, the internal combustion engine 10 can change to an overrun mode. However, a high oxygen input into the exhaust system 20 during overrun operation of the internal combustion engine 10 can result in the oxygen storage components of the three-way catalytic converters 46, 48 being completely loaded with oxygen. In order to prevent this loading, fuel is initially burned in the combustion chambers of the internal combustion engine 10 during overrun until the exhaust valve is completely closed and the three-way catalytic converters 46, 48 are decoupled from the exhaust gas stream of the internal combustion engine 10. "Overrun" is understood in this context as a driving mode of a motor vehicle in which the internal combustion engine 10 is towed by the rolling motor vehicle. During overrun operation, the injection of fuel into the combustion chambers 12 of the internal combustion engine 10 is prevented, which is referred to as so-called overrun fuel cutoff. With the exhaust flap open, this would lead to the internal combustion engine 10 conveying fresh air with a high oxygen content through the combustion chambers 12 into the exhaust system 40. This must be avoided, not least because the high oxygen input when the particulate filter 52 is at high temperatures could lead to uncontrolled soot burn-off on the particulate filter 52 and thus to thermal damage to the particulate filter 52. As soon as the exhaust flap is fully closed and the exhaust gas recirculation valve 68 is opened, the exhaust gas of the internal combustion engine 10 circulates via the exhaust gas recirculation line 62 back into the air intake system 20 of the internal combustion engine 10, and the internal combustion engine 10 is operated in an unfired overrun mode in which no fuel is supplied to the combustion chambers 12. As a result, no excess oxygen enters the exhaust system 40, and an undesirable loading of the oxygen storage component of the three-way catalytic converters 46, 48 and uncontrolled soot conversion can be effectively prevented. The closing of the pre-throttle valve 26 minimizes suction-side afterflow of fresh air. As a result, a negative pressure is produced in the air intake system 20 downstream from the pre-throttle valve 26 and upstream from the compressor 32 of the exhaust gas turbocharger 30 that increases the scavenging gradient over the exhaust gas recirculation line 62 between the exhaust system 40 and the air intake system 20 and thus promotes exhaust gas circulation. In the case of prolonged overrun operation, it is possible to introduce small amounts of fuel into the combustion chambers 12 of the internal combustion engine 10 via the lambda control of the three-way catalytic converter 42 in order to compensate for the fresh air penetrating into the air intake system 20 due to leakage and convert the excess oxygen on one of the three-way catalytic converters 46, 48. As a result, an accumulation of the oxygen concentration is avoided, whereby the loading of the oxygen storage component of the three-way catalysts 46, 48 can be effectively avoided even in the event of longer overrun phases. When the driver again requests a desired torque from the internal combustion engine 10, the exhaust flap and the pre-throttle valve 26 are opened again and the exhaust gas recirculation valve 68 is closed in order to restore normal operation.

Figure 2:
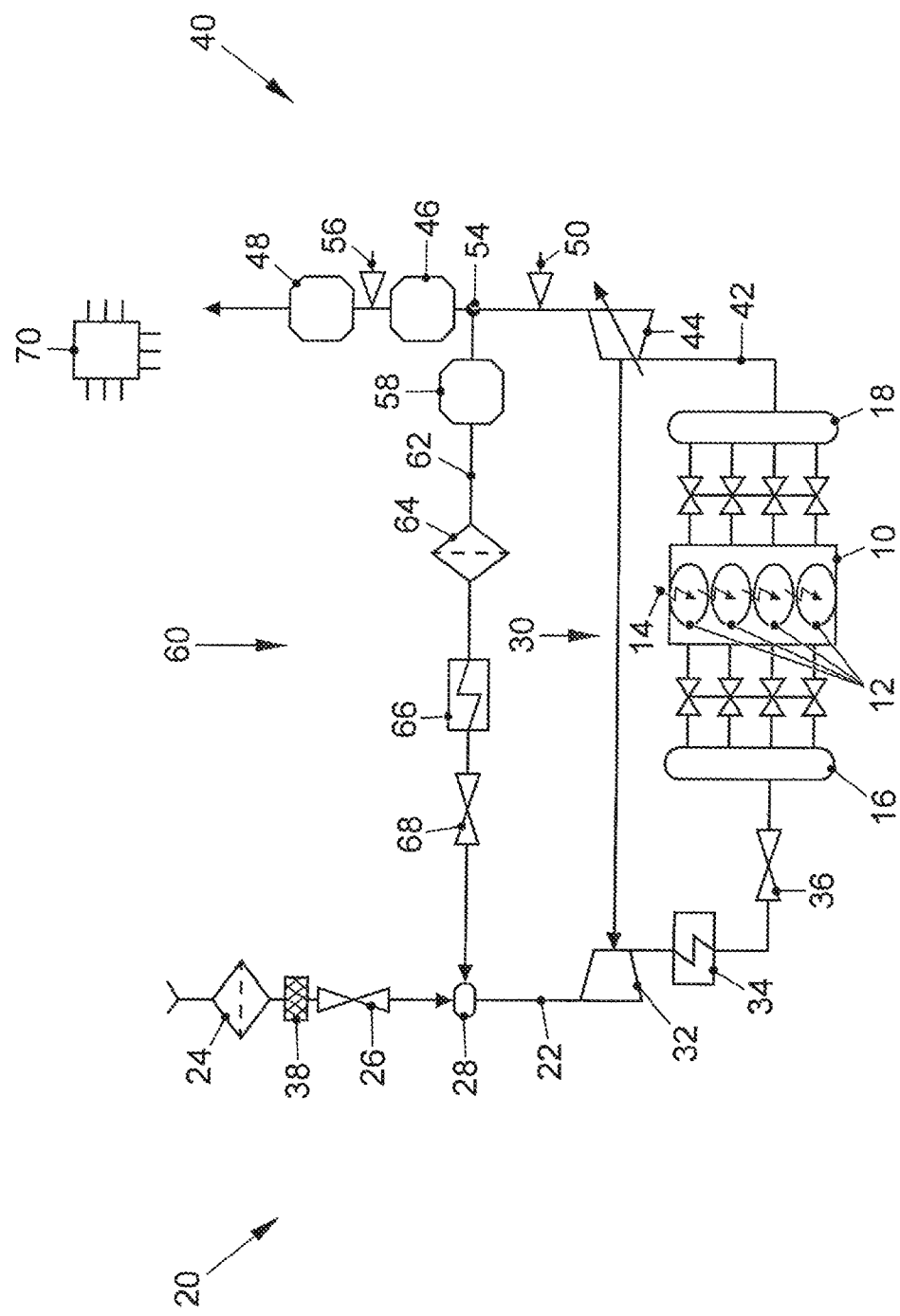
FIG. 2 shows another embodiment of an internal combustion engine according to the invention, in which a catalytic converter is additionally arranged in the low-pressure exhaust gas recirculation system.

FIG. 2 shows another exemplary embodiment of an internal combustion engine 10 according to the invention. With essentially the same construction as that shown in FIG. 1, an additional three-way catalytic converter 58 is provided in the exhaust gas recirculation duct 62 of the low-pressure exhaust gas recirculation system 60 downstream from the branch 54 and upstream from the filter 64. Unburned hydrocarbons and carbon monoxide can be converted into carbon dioxide and water vapor by the additional three-way catalytic converter 58. This prevents an acidic fluid in the exhaust gas recirculation line 62 or the air intake system 20 from condensing out and leading to corrosion there. Furthermore, nitric oxide with the unburned hydrocarbons can be reduced to elemental nitrogen or oxidized to nitrogen dioxide in order to reduce the tendency of the internal combustion engine 10 to knock.

Figure 3:
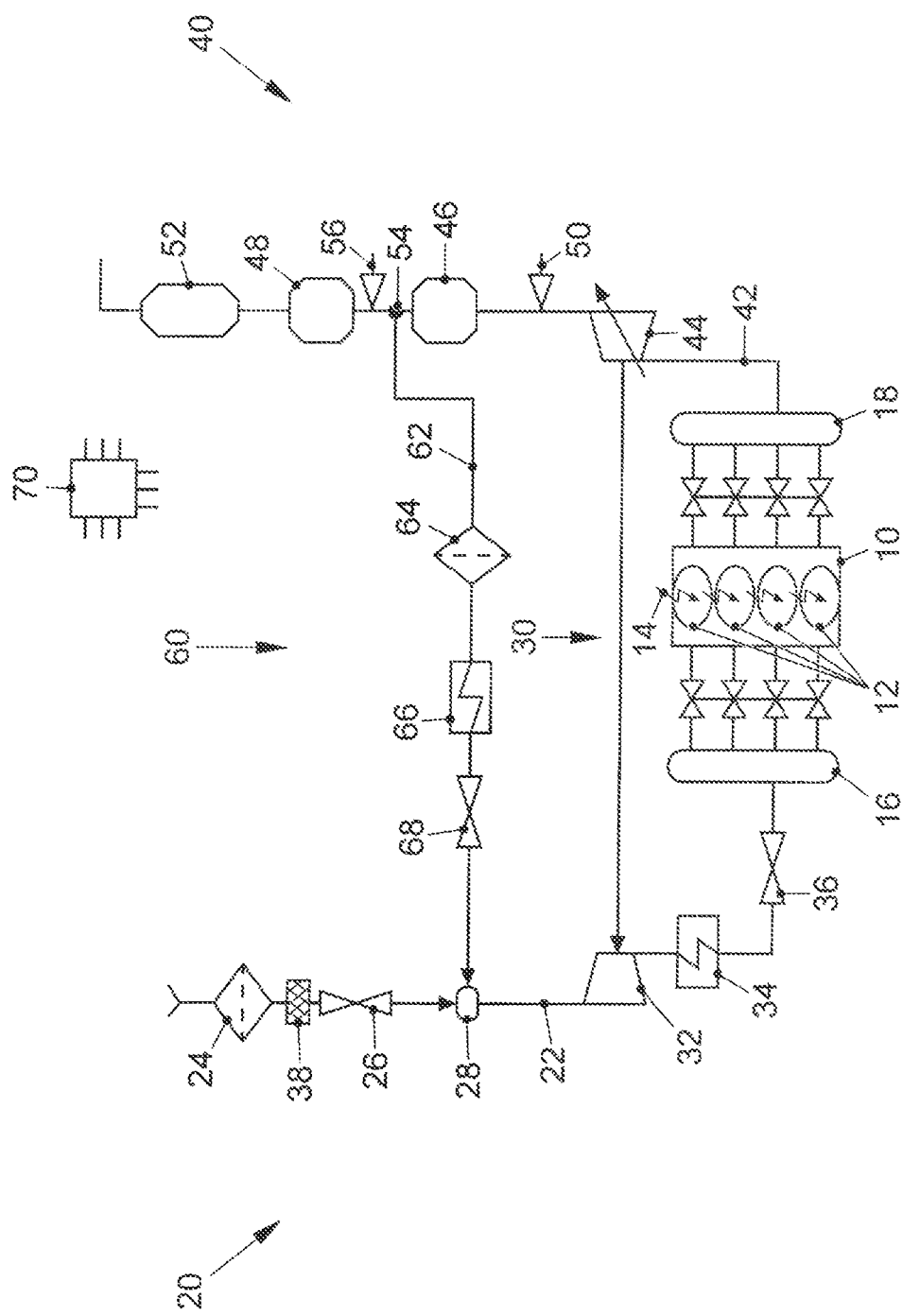
FIG. 3 shows another exemplary embodiment of an internal combustion engine according to the invention, in which the low-pressure exhaust gas recirculation system branches off from the exhaust duct downstream from the first catalytic converter and upstream from the second catalytic converter.

FIG. 3 shows another exemplary embodiment of an internal combustion engine 10 according to the invention. With essentially the same construction as that shown in FIG. 1, a particulate filter 52, particularly a gasoline particulate filter, is arranged downstream from the second three-way catalytic converter 48 in this exemplary embodiment. In this exemplary embodiment, the exhaust gas recirculation line 62 of the low-pressure exhaust gas recirculation system 60 branches off from the exhaust duct 42 downstream from the first three-way catalytic converter 46 and upstream from the second three-way catalytic converter 48. As a result, in circulation mode, the first three-way catalytic converter 46 is flowed through by the circulating, stoichiometric exhaust gas, and the second three-way catalytic converter 48 is essentially decoupled from the exhaust gas flow. Even in the event that fresh air flows from the air intake system 20 and the circulating exhaust gas becomes superstoichiometric, this has the effect that the oxygen storage components in the second three-way catalytic converter 48 are not filled. As a result, upon resumption of fired operation of the internal combustion engine 10, at least the second catalytic converter 48 can be used immediately for efficient conversion of pollutants in the exhaust gas.

Figure 4:
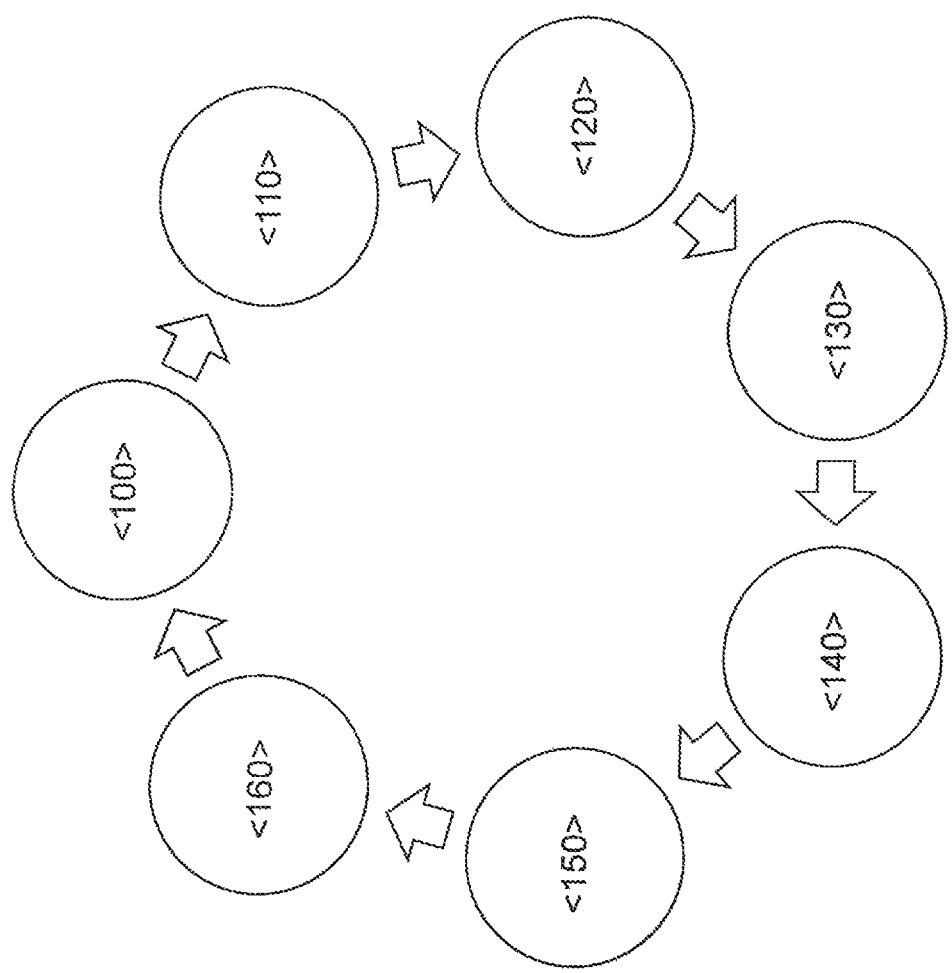
FIG. 4 shows a flowchart for carrying out a method according to the invention for exhaust gas aftertreatment of an internal combustion engine.

FIG. 4 shows a flowchart for carrying out a method according to the invention for exhaust gas aftertreatment of an internal combustion engine 10. In a first method step <100>, the internal combustion engine 10 is operated in a normal mode with a stoichiometric combustion air ratio, and the limited pollutants resulting from engine combustion in the combustion chambers 12 of the internal combustion engine 10 are removed from the exhaust gas flow of the internal combustion engine 10 by the exhaust gas aftertreatment components 46, 48, 52 or converted into unlimited exhaust gas components. In a method step <110>, an overrun condition of the internal combustion engine or a desired engine stop is registered and the overrun fuel cut-off routine is initiated. In a method step <120>, and as a function of the operating condition of the internal combustion engine 10, particularly as a function of the speed of the internal combustion engine 10, the exhaust flap and the pre-throttle valve 26 are closed, the exhaust gas recirculation valve 68 is opened, and the throttle valve 36 is opened in ordered sequence for this purpose. Stoichiometric exhaust gas is thus removed from the exhaust system 40 and fed to the air intake system 20. As soon as the exhaust gas mass passing through the intake path reaches the combustion chambers 12 of the internal combustion engine 10, the injection of fuel into the combustion chambers 12 of the internal combustion engine 10 is stopped and the ignition of the internal combustion engine 10 is deactivated in a method step <130>. A runtime model for the flow of the exhaust gas through the low-pressure exhaust gas recirculation system 60 that is stored in the engine control unit 70 of the internal combustion engine 10 is required for this purpose. As a support, the oxygen concentration in the exhaust gas or the oxygen can be determined by means of the first lambda sensor 50, or the oxygen concentration air intake system can be determined by means of another lambda sensor.

As a function of the drag torque impressed on the internal combustion engine 10, it executes the overrun phase or runs to a standstill. At the same time, stoichiometric exhaust gas is conveyed through the low-pressure exhaust gas recirculation system 60, the air intake system 20, the combustion chambers 12, and the exhaust duct 42 in a circuit, whereas the exhaust gas flow comes to a standstill in the exhaust duct 42 downstream from the branch of the exhaust gas flow with the exception of a small amount of leakage.

If a restart of the internal combustion engine 10 is requested in a method step <140>, the pre-throttle valve 26 is opened and the throttle valve 36 and the exhaust gas recirculation valve 68 are closed in a method step <150>, so that fresh air is supplied again to the combustion chambers 12 of the internal combustion engine 10. In a method step <160>, the fuel injection into the combustion chambers 12 of the internal combustion engine 10 and the ignition are then reactivated. During the subsequent engine run-up, the runtime models from the engine control unit 70 are again used and the throttle valves 26, 36 and the exhaust gas recirculation valve 68 are controlled such that the stoichiometric state in the exhaust aftertreatment components 46, 48, 52 does not change. This control can be supported by the lambda sensor 50 and an additional lambda sensor in the air intake system 20. Moreover, it is possible to directly approach an engine operating point of the internal combustion engine 10 that utilizes the low-pressure exhaust gas recirculation system 60 in order to minimize the raw emissions of the internal combustion engine 10. In order to fully obtain the thermodynamic effect of the exhaust gas recirculation, and in order to prevent acidic condensate from forming in the exhaust gas recirculation line 62, the latter is optionally outfitted with its own three-way catalytic converter 58.

The method according to the invention provides the following advantages. Since the stoichiometric operating condition is maintained in the exhaust aftertreatment components 46, 48, 52, in particular in the two three-way catalytic converters 46, 48 in all operating conditions, there is no risk of nitrogen oxide desorption at any operating point. The resulting nitrogen oxides can be converted at any time by the three-way catalytic converters 46, 48. This means that, at startup of the internal combustion engine 10, no substoichiometric operating condition is necessary in order to clear the oxygen storage component of the three-way catalytic converters 46, 48. This results in lower emissions and an advantage in terms of consumption. Cooling of the exhaust system 40 is prevented, since the positioning of the branch 54 for the exhaust gas recirculation duct 62 upstream from the first three-way catalytic converter 46, the three-way catalytic converters 46, 48 are not purged with fresh air, and entry of fresh air through the pre-throttle valve 26 is prevented. In principle, the circulation mode can also be used to flush out soot residues and water condensation from the low-pressure exhaust gas recirculation system 60. Through appropriate constructive measures, the soot residues or water condensation are to be prevented from striking the compressor 32 of the exhaust gas turbocharger 30 at high speed in order to prevent damage from occurring.

LIST OF REFERENCE SYMBOLS 10 combustion engine
12 combustion chamber
14 spark plug
16 inlet
18 outlet
20 air intake system
22 intake port
24 air filter
26 pre-throttle valve
28 junction
30 exhaust gas turbocharger
32 compressor
34 charge air cooler
36 throttle valve 38 air mass meter
40 exhaust system
42 exhaust duct
44 turbine
46 first three-way catalytic converter
48 second three-way catalytic converter
50 lambda sensor
52 particulate filter
54 branch
56 second lambda sensor
58 third three-way catalytic converter
60 low-pressure exhaust gas recirculation
62 exhaust gas recirculation line
64 filter
66 exhaust gas recirculation cooler
68 exhaust gas recirculation valve
70 engine control unit

The invention claimed is:

1. An internal combustion engine comprising:
a plurality of combustion chambers,
a spark plug for igniting a fuel-air mixture arranged at each combustion chamber,
an air intake system,
an exhaust system,
an exhaust gas turbocharger configured to charge the internal combustion engine, wherein at least a first three-way catalytic converter and, downstream of the first three-way catalytic converter, a second three-way catalytic converter are provided in the exhaust system,
a low-pressure exhaust gas recirculation system that connects the exhaust system downstream from a turbine of the exhaust gas turbocharger and upstream from all catalytically active exhaust gas aftertreatment components of the first and second three-way catalytic converters to the air intake system upstream from a compressor of the exhaust gas turbocharger,
a first throttle valve arranged in the air intake system upstream of an inlet of an exhaust gas recirculation line of the low-pressure exhaust gas recirculation system,
a second throttle valve arranged in the air intake system downstream of a compressor of the exhaust gas turbocharger,
an exhaust gas flap arranged in an exhaust gas duct of the exhaust system downstream of a branch of the exhaust gas recirculation line from the exhaust gas duct, and
an exhaust gas recirculation valve arranged in the low-pressure exhaust gas recirculation line, and
an engine control unit.

2. The internal combustion engine as set forth in claim 1, wherein the low-pressure exhaust gas recirculation system has an exhaust gas recirculation line that branches off at a branch immediately downstream from the turbine and upstream from all exhaust aftertreatment components from an exhaust duct of the exhaust system and that leads into an intake port of the air intake system at a junction downstream from an air filter and upstream from the compressor.

3. The internal combustion engine as set forth in claim 1, further comprising an exhaust gas recirculation cooler arranged in the low-pressure exhaust gas recirculation system.

4. The internal combustion engine as set forth in claim 1, further comprising an additional three-way catalytic converter arranged in the low-pressure exhaust gas recirculation system.

5. The internal combustion engine as set forth in claim 1, wherein the first three-way catalytic converter is arranged in the exhaust system upstream from the branch and the second three-way catalytic converter is arranged downstream from the branch.

6. The internal combustion engine as set forth in claim 1, wherein one of the three-way catalytic converters is embodied as a particulate filter with a three-way catalytically active coating.

7. The internal combustion engine as set forth in claim 1, further comprising a particulate filter arranged downstream from at least one of the first and second three-way catalytic converters.

8. The internal combustion engine as set forth in claim 1, wherein the exhaust flap is configured to block the exhaust duct.

9. A method for exhaust aftertreatment of an internal combustion engine, wherein the internal combustion engine comprises:
a plurality of combustion chambers,
a spark plug for igniting a fuel-air mixture arranged at each combustion chamber,
an air intake system,
an exhaust system,
an exhaust gas turbocharger configured to charge the internal combustion engine, wherein at least a first three-way catalytic converter and, downstream of the first three-way catalytic converter, a second three-way catalytic converter are provided in the exhaust system,
a low-pressure exhaust gas recirculation system that connects the exhaust system downstream from a turbine of the exhaust gas turbocharger and upstream from all catalytically active exhaust gas aftertreatment components of the first and second three-way catalytic converters to the air intake system upstream from a compressor of the exhaust gas turbocharger,
a first throttle valve arranged in the air intake system upstream of an inlet of an exhaust gas recirculation line of the low-pressure exhaust gas recirculation system,
a second throttle valve arranged in the air intake system downstream of a compressor of the exhaust gas turbocharger,
an exhaust gas flap arranged in an exhaust gas duct of the exhaust system downstream of a branch of the exhaust gas recirculation line from the exhaust gas duct, and
an exhaust gas recirculation valve arranged in the low-pressure exhaust gas recirculation line, and
an engine control unit
the method comprising the following steps:
detecting a thrust mode of the internal combustion engine,
closing the first throttle valve in the air intake system upstream upon detection of a thrust operation of the internal combustion engine,
closing the exhaust flap in the exhaust duct upon detection of a thrust operation of the internal combustion engine,
opening the exhaust gas recirculation valve and the second throttle valve in the air intake system downstream from the compressor of the exhaust gas turbocharger when an overrun operation of the internal combustion engine is detected,
switching off the ignition and a fuel injection into the combustion chambers of the internal combustion engine during the overrun operation of the internal combustion engine, and
circulating the exhaust gas through the low-pressure exhaust gas recirculation system, the air intake system downstream from the junction, the combustion chambers of the internal combustion engine, and the exhaust system upstream from the branch, wherein an introduction of fresh air into all catalytically active exhaust gas aftertreatment components is prevented during the overrun operation of the internal combustion engine.

10. The method as set forth in claim 9, wherein the circulating exhaust gas substantially has a stoichiometric combustion air ratio.

11. The method as set forth in claim 9, wherein the oxygen content of the circulating exhaust gas is monitored by a lambda sensor.

12. The method as set forth in claim 9, further comprising decelerating the internal combustion engine in the overrun phase and until it comes to a standstill, opening the first throttle valve and the second throttle valve, and closing the exhaust gas recirculation valve before the internal combustion engine is started again.

13. The method as set forth in claim 9, wherein an additional three-way catalytic converter is arranged in the low-pressure exhaust gas recirculation system, further comprising converting unburned hydrocarbons and carbon monoxide to carbon dioxide and water vapor by the additional three-way catalytic converter in order to prevent acidification as a result of condensation in the low-pressure exhaust gas recirculation system or in the air intake system, and oxidizing nitric oxide to nitrogen dioxide in order to reduce the tendency of the internal combustion engine to knock.

* * * * *